Figure 1:
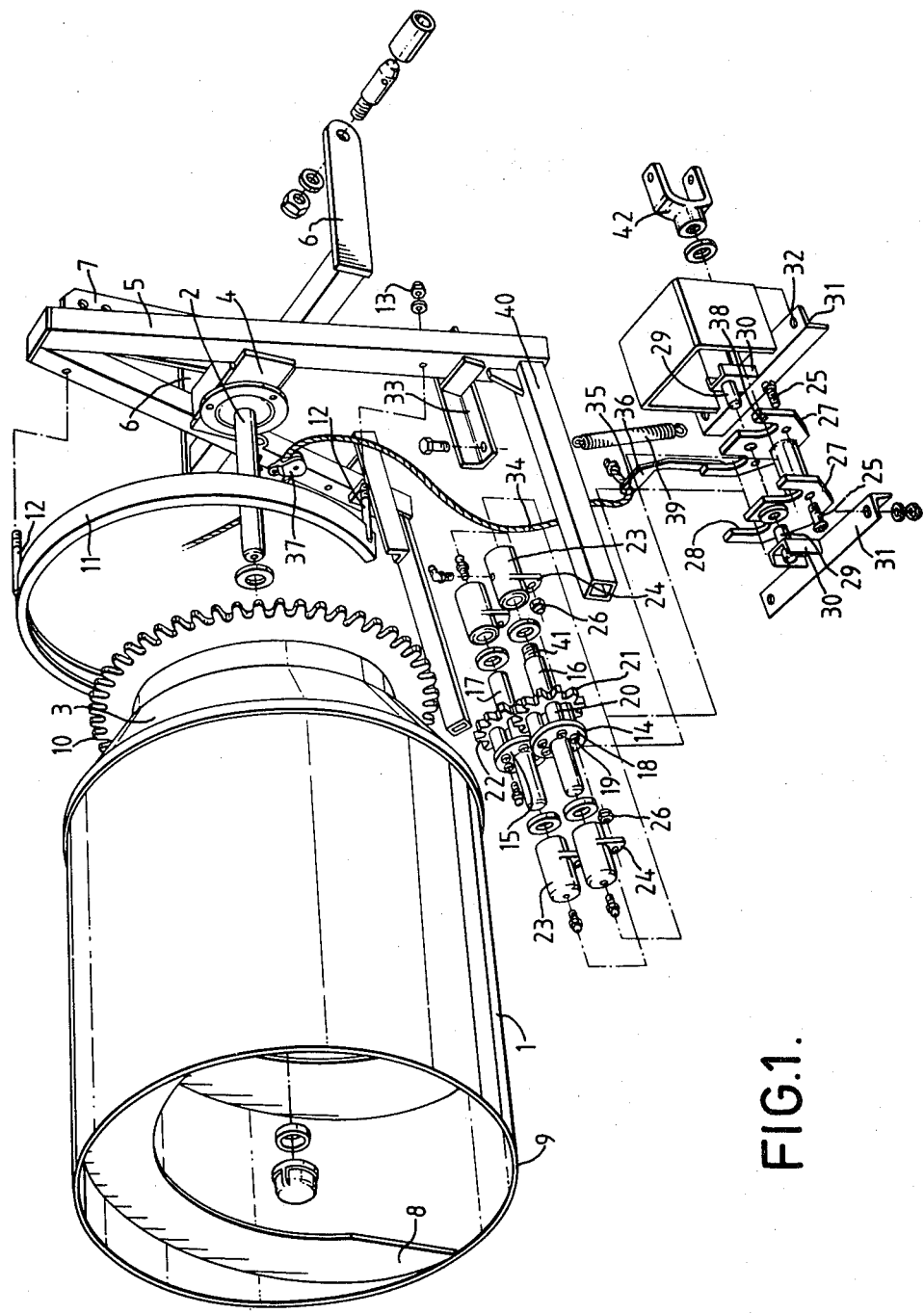

United States Patent [19]

Teagle

[11] 4,382,683

[45] May 10, 1983

[54] MIXING MACHINES

[76] Inventor: Thomas J. Teagle, Blackwater, Truro, Cornwall, TR4 8HQ, England

[21] Appl. No.: 190,334

[22] Filed: Sep. 24, 1980

[30] Foreign Application Priority Data

Sep. 24, 1979 [GB] United Kingdom ................ 7933043

[51] Int. Cl.³ ............................................. B28C 7/16
[52] U.S. Cl. ..................................... 366/44; 366/187; 74/384; 74/404; 74/465
[58] Field of Search .................. 366/44, 606, 184, 189, 366/187, 194, 195, 196, 219, 54, 55, 60; 74/465, 384, 404

[56] References Cited

U.S. PATENT DOCUMENTS

| 277,802 | 5/1883 | Stanley | 74/465 |
| 1,867,838 | 7/1932 | Jaeger | 366/44 |
| 2,836,073 | 5/1958 | Masters | 74/404 |

*Primary Examiner*—Robert W. Jenkins
*Attorney, Agent, or Firm*—Burns, Doane, Swecker & Mathis

[57] ABSTRACT

In a rotary drum mixing machine of the kind in which the drum is rotated in opposite directions to mix and eject its contents respectively by a prime-mover operating through driving and driven means on a prime-mover driven shaft and the closed end of the drum respectively, reversal of the direction of rotation of the drum can be effected without reversing the prime-mover by a pivotally mounted pair of gear wheels which are continuously driven in opposite directions by the prime-mover and are alternately movable into operative engagement with the driving means for the drum.

11 Claims, 2 Drawing Figures

MIXING MACHINES

This invention relates to rotary drum mixing machines for concrete and a variety of other materials including seed dressings and fertilisers, and is concerned with a machine of the kind in which the rotary drum contains a device, such as a helix, which is operable, on rotation of the drum in one direction to effect mixing and on rotation of the drum in the opposite direction, to eject the contents of the drum through its open end.

The drive to the drum usually includes driven means in the form of a gear wheel, sprocket or pulley secured to the drum and operatively connected to corresponding driving means on a prime-mover driven shaft and it is the principal object of the present invention to provide simple and efficient drive transmission means which permits of ready reversal of the direction of rotation of the drum without having to reverse the prime mover.

To this end, according to a principal feature of the invention, two gear wheels are interposed between the driving means and the prime-mover-driven shaft and operatively connected to the latter for continuous rotation in opposite directions about parallel axes in a cradle or like mounting which is pivotable about an axis parallel with the axes of rotation of said gear wheels, to selectively move each gear wheel into and out of a position in which its rotation is transmitted through said driving means and said driven means to rotate said drum in one or other direction.

The driven means preferably consists of a toothed wheel secured to the drum and adapted to be directly engaged by driving means in the form of one or more pinions.

In this case the driving means may comprise two pinions, each of which is secured to and rotatable with one of the two gear wheels and is adapted in response to pivotal movement of said cradle to move into or out of meshing engagement with the toothed wheel on the drum.

Alternatively, the driving means may comprise only one pinion which is secured to a further gear wheel which is operatively engaged by one or other of said aforementioned gear wheels when said cradle is pivoted about its axis.

Figure 2:
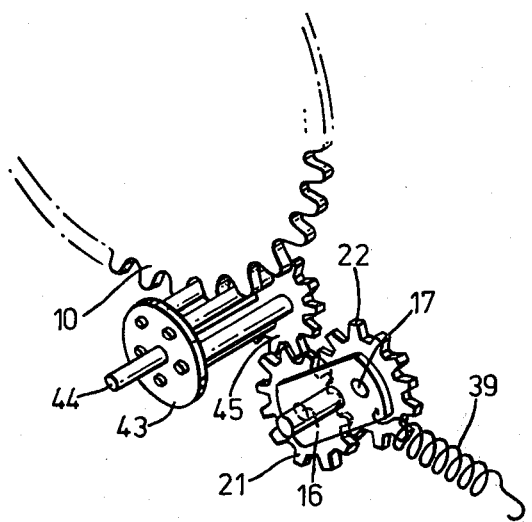

The invention will be described in more detail, by way of example, with reference to the accompanying drawings in which:

FIG. 1 is an exploded perspective view of part of a tractor-mounted mixing machine incorporating the invention; and FIG. 2 is a fragmentary view showing an alternative form of drive for the drum.

Referring first to FIG. 1, a mixing drum 1 is rotatably mounted on a pin 2 extending through the closed end 3 of the drum from the cross-piece 4 of an A-frame 5 which is adapted to be secured to the three-point linkage of an agricultural tractor (not shown) through the medium of arms 6 and an upright member 7 attached to the front of the frame 5.

The drum 1 is provided with an internal helical member 8 which is operable, on rotation of the drum about its axis in one direction, to effect mixing of its contents and, on rotation of the drum in the opposite direction, to eject the contents of the drum through its open end 9.

The closed end 3 of the drum 1 carries a gear wheel 10 enclosed over most of its periphery by a guard 11 secured to the frame 5 by pins 12 passing through apertures in the frame and threaded at their ends to receive nuts 13.

The unguarded lower portion of the gear wheel 10 is engaged by one or other of two pinions 14 and 15 which are fixed to shafts 16 and 17 respectively and each of which comprises a disc 18 from which project a plurality of hardened pins 19 carrying hardened rollers 20 which rotate on the pins and are individually lubricated. The pins 19 connect the discs 18 of the pinions 14 and 15 to gear wheels 21 and 22 respectively which are also fixed to the shafts 16 and 17 respectively and are in continuous meshing engagement with one another. On opposite sides of the pinions 14, 15 and gear wheels 21, 22 the shafts 16, 17 are rotatably mounted in sleeves 23 having flanges 24 which are secured by bolts 25 and nuts 26 to plates 27 which are recessed at 28 to receive the sleeves 23 and are pivotally mounted on pins 29 projecting from brackets 30 on cross-members 31 bolted at 32 to longitudinal frame members 33. The plates 27 thus form the ends of a cradle which can be rocked about the axis of the pins 29 by manipulation of a cord 34 anchored at 35 to an extension 36 on one side of one of the plates 27 and extending over a pulley 37 to a point within reach of the tractor driver. The other side of the plate 27 having the extension 36 is anchored at 38 to one end of a tension spring 39, the other end of which is anchored to a longitudinal frame member 40.

The shaft 16 extends right through the forward one of the associated sleeves 23 and is threaded at 41 for attachment to a coupling 42 for the power-take off shaft (not shown) of the tractor.

In operation, the tractor power take-off shaft drives the shaft 16 to rotate the pinion 14 and the gear wheel 21, which latter rotates the gear wheel 22 and with it the pinion 15 and shaft 17 in the opposite direction to the shaft 16. The spring 39 biasses the cradle in an anticlockwise direction, as viewed from the left in FIG. 1, to bring the pinion into meshing engagement with the gear wheel 10 on the drum to drive the latter in a direction to effect mixing of its contents. When mixing is completed the tractor driver pulls the cord 34 to rock the cradle against the action of spring 39 in a clockwise direction about the pivot pins 29 to disengage the pinion 14 from and engage the pinion 15 with the gear wheel 10 to rotate the drum in the opposite direction to discharge its contents from the open end thereof. Upon release of the cord 34 the spring 39 returns the cradle to its original position in which the pinion 14 is once again in engagement with the gear wheel 10.

In the modification illustrated in FIG. 2 the pinions 14 and 15 are replaced by a single pinion 43 in continuous meshing engagement with the gear wheel 10 on the drum and mounted on a separate shaft 44 carrying an additional gear wheel 45 fixed to the pinion 43 and adapted to be alternately engaged by the gear wheels 21 and 22 on the shafts 16 and 17 when the cradle is biassed by the spring 39 and rocked by the cord 34 respectively.

The single pinion 43 may be replaced by a sprocket or pulley (not shown) which is mounted on the shaft 44 with the gear wheel 45 and operatively connected by a chain or belt to a sprocket or pulley (not shown) secured to the drum 1 in place of the gear wheel 10.

The machine described is mainly intended for use by farmers since it can be fitted to the three-point linkage of an agricultural tractor and driven from the tractor power take-off. It can also, however, be mounted on a free-standing frame and driven by any other prime-mover.

I claim:

1. A rotary drum mixing machine of the kind in which the drive to the drum includes driven means secured to the drum and operatively connected to driving means on a prime-mover driven shaft, said machine comprising drive transmission means which permit reversal of the direction of rotation of the drum without having to reverse the prime mover, said drive transmission means being interposed between the driving means and the prime-mover driven shaft and including two gear wheels mounted for continuous meshing engagement with one another on parallel shafts, one of said shafts being operatively connected to the prime mover driven shaft for continuous rotation of said gear wheels in opposite directions about the shaft axes, both of said shafts being rotatably mounted in a cradle which is pivotable about an axis parallel with the axes of rotation of said gear wheels, said cradle being adapted to selectively move each gear wheel into and out of a position in which its rotation is transmitted through said driving means and said driven means to rotate said drum in one or the other direction.

2. A machine according to claim 1, wherein said parallel shafts pass through sleeves secured to and seated in said cradle.

3. A machine according to claim 1, wherein said driven means comprises a toothed wheel secured to the drum and said driving means comprises at least one pinion for direct engagement with said toothed wheel.

4. A machine according to claim 3, wherein said driving means comprises two pinions of which one is secured to and rotatable with one of said gear wheels and the other of which is similarly secured to the other of said gear wheels, said pinions being alternately movable into meshing engagement with said toothed wheel on the drum in response to pivotal movement of said cradle in opposite directions.

5. A machine according to claim 4, wherein said pinions are secured to said shafts for rotation therewith.

6. A machine according to claim 4, wherein each pinion comprises a disc and a plurality of hardened pins projecting axially from said disc, each pin carrying a roller rotatable thereon about the axis thereof.

7. A machine according to claim 3, wherein said driving means comprises a single pinion in continuous meshing engagement with the toothed wheel on said drum, said pinion being secured to and rotatable with a third gear wheel in a position to be operatively engaged alternately by said first-mentioned gear wheels when said cradle is rocked in opposite directions about its pivotal axis.

8. A machine according to claim 7, wherein said single pinion and said third gear wheel are mounted on a separate shaft extending parallel with said first-mentioned shafts.

9. A machine according to claim 7, wherein the pinion comprises a disc and a plurality of hardened pins projecting axially from the disc, each pin carrying a roller rotatable thereon about the axis thereof.

10. A machine according to claim 3, wherein the at least one pinion comprises a disc and a plurality of hardened pins projecting axially from said disc, each pin carrying a roller rotatable thereon about the axis thereof.

11. A machine according to claim 1, wherein said cradle is biased in one direction about its pivot by a spring and is rocked in the opposite direction through a manually actuated cord.

* * * * *